UNITED STATES PATENT OFFICE.

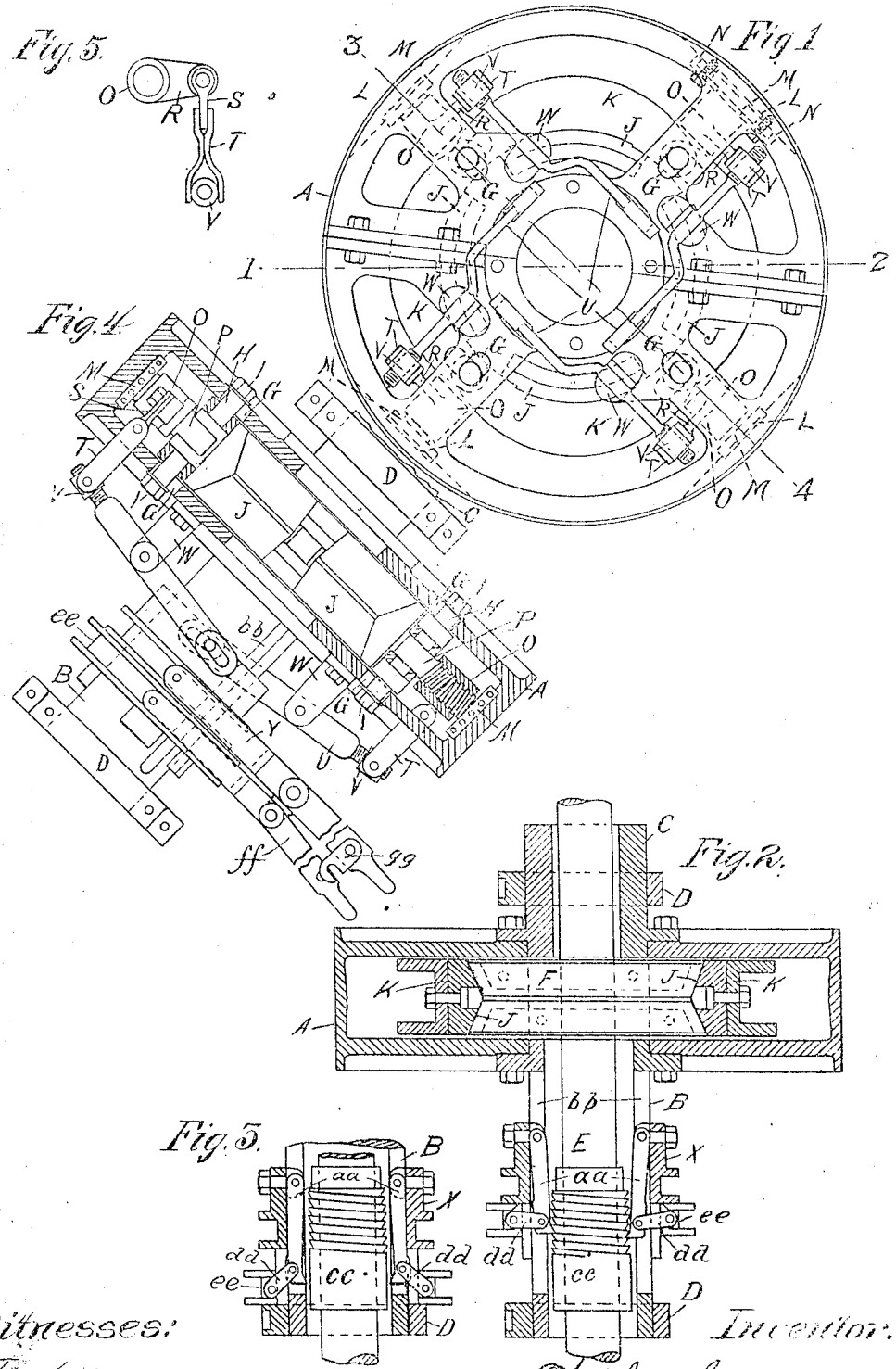

WALTER COMMON, OF GERMISTON, TRANSVAAL.

FRICTION-CLUTCH.

No. 885,323.	Specification of Letters Patent.	Patented April 21, 1908.

Application filed June 5, 1907. Serial No. 377,327.

*To all whom it may concern:*

Be it known that I, WALTER COMMON, a subject of the King of Great Britain, and a resident of Germiston, in the district of Witwatersrand, Transvaal, have invented a new and Improved Friction-Clutch, of which the following is a specification.

The objects of my improvements are

1st. To carry the clutch by means of the gripping pieces alone, the internal bore of the clutch having no contact with the shaft except by means of said gripping pieces. As a consequence when the gripping pieces are released the weight of the clutch and pull of the belt being taken up by suitably disposed supports there will be no friction therefore no lubrication or attention required when the clutch is at rest.

2nd. To make the clutch practically non-slipping as in the event of slip a screw arrangement automatically comes into operation which tightens the grip of the friction pieces on the disk, which tightening will continue till the clutch runs at the same speed as the shaft.

I attain these objects by the mechanism illustrated in the accompanying drawing in which Figure, 1 is an elevation of the pulley which forms the inclosing shell of the clutch with parts of the clutch operating mechanism omitted. Fig., 2 is a section on the line 1. 2. Fig., 1 also a section of the quills and automatic tightening arrangement when in gear. Also an elevation of the disk and shaft with parts omitted for sake of clearness. Fig., 3 is a section of the automatic tightening arrangement when out of gear. Fig., 4 is a section on line 3 4 Fig., 1 also an elevation of quills, bearings, and operating levers. Fig., 5 is an elevation of the links connecting the operating levers with the nuts.

In carrying out the invention the pulley A has fixed to it at each side a hollow cylindrical piece hereinafter designated the quills one somewhat longer than the other, the long one being marked on the drawing B and the short one C.

The shaft E. passes through the quills and center of pulley and is fitted with a disk F. the periphery of which is grooved. In the arms of the pulley at either side are formed coincident elongated slots G. in which are positioned pins H. adapted to move inwards and outwards in said slots, being retained therein by nuts I. screwed on their outer extremities four such pins are employed.

The gripping pieces J. are formed of wood or any other suitable substance, in four circular segments. These pieces are bolted to curved bands K, approximately a quarter of a circle in length so that the four segments completely surround the disk. The ends of the curved bands are constructed with holes through which project the pins H, fixed between the arms of the pulley, one hole in each band being elongated to allow of contraction or expansion of bands when the clutch is thrown into or out of operation.

In the internal periphery of the pulley are formed four recesses L. in which are placed four screws M. held in position by clamping plates N (see dotted lines in Fig. 1) holes being drilled in the heads of these screws for adjustment by means of a toggle bar. Onto each of these screws is screwed a nut O. which nut is also constructed with an opposite thread on the inside with which a correspondingly threaded piece P engages. This latter piece or screw is constructed in the form of an eye and engages the pin H. between adjacent ends of the bands K. It will be noted that as the nuts O are turned (as by the mechanism hereinafter described) the threaded pieces P will be forced radially inward carrying with them the pins H, which action will press the curved bands K inward carrying with them the shoes or gripping pieces J and crowding the latter firmly against the disk or drum F. The nuts O. are constructed with lugs R. On each lug is pivoted one end of a link S. the other end of said link being twisted a quarter turn to engage the bifurcated link T. connected to the operating levers U. which levers moving inwards or outwards actuate the nuts O. and cause the gripping pieces to contact with or be released from the disk. The connection between these parts is made adjustable by constructing the ends of the levers U. with a screw thread and threading thereon a ring V. formed with projections which engage the bifurcated links T.

The levers U. are pivoted on brackets W. fixed to the arms of the pulley and are simultaneously actuated by means of a piece X. mounted on the quill B. which piece can be moved longitudinally thereon by means of the bifurcated lever Y. Pivoted on the piece X. are two pawls a. a. which move with X in slots b. b. cut in the quill B. one end of these pawls being made of a shape corresponding to the thread cut on a piece c. c. fastened to the shaft. These pawls are connected by means of links d. d. to a piece e. e. mounted on the piece X. which can be moved longitudinally thereon by means of the bifurcated lever f. f.

When the clutch is thrown into operation by means of the lever Y. and runs at or about the same speed as the shaft the piece e. e. is moved along by the lever f. f. causing the pawls a. a. to engage the screw thread on the shaft the links d. d. passing over mid-position are locked. The lever Y. may then be released the strain of keeping the gripping pieces tight on the disk being taken by the pawls. In the event of the pulley slipping or going slower than the shaft the screw would travel the pawls along and with them the piece X carrying the actuating levers thereby tightening the gripping pieces on the disk.

When the clutch is thrown out of operation the pawls are withdrawn from the thread and the lever f. f. fastened to the lever Y. by means of the clamp g. g. The piece X is then moved back by means of the lever Y. the gripping pieces being released. The clutch rests in the supports D. It will thus be seen that the clutch shoes may be caused to grasp the drum and without throwing the grip regulating device including the pawls a—a into operation, this by the simultaneous movement of the levers, and further that the pawls a—a may be thrown into operation by a movement of the lever f—f independently of the lever Y. These supports are bored larger than the external diameter of the quills so that when the clutch is in operation being brought central with the shaft by means of the gripping pieces the quills will run freely in and clear of supports.

What I claim as my invention and desire to secure by Letters Patent is—

1. A driving member and a driven member, one of said parts including a drum secured thereto and the other having shoes carried thereby to grip said drum, a threaded member borne by each shoe and a threaded member located off the shoe, said threaded members having a connecting threaded member movable to cause the shoes to grip the drum, means for adjusting said threaded members one with respect to another, and means for operating said connecting threaded member.

2. A driving member and a driven member, one of said parts including a drum secured thereto and the other including a pulley having arms that include separated members in a single arm, shoes extending from one to another of said arms and linked together and arranged to grip said drum, and means for exerting force radially upon the shoes to crowd them against the drum.

3. A driving member and a driven member, one of said parts including a drum secured thereto and the other of said parts including a pulley with arms that include separated members in a single arm, shoes each extending from one to another of said arms and each having its ends located between the members of said arms and guided thereby, and means for forcing the shoes to grip said drum.

4. A driving member and a driven member, one of said parts including a shaft with a drum secured thereto and the other of said parts including a pulley with arms that include separated members in a single arm having guide slots, a line of shoes extending around the drum, the ends of the shoes meeting and being joined between the members of said arms, means extending from the shoes into the slots to guide the shoes in their radial movement, and means for forcing the shoes to bind the drum.

5. A driving member and a driven member, one of said parts including a drum secured thereto and the other including a pulley having arms that include separated members in a single arm, shoes extending circumferentially from one to another of said arms and with their ends located between the members of the arms, loose connections between the ends of said shoes uniting the same between the members of the arms, a threaded part connected with the meeting ends of said shoes between the members of each arm, connecting threaded parts located off the shoes between the members of each of the arms, connecting threaded parts appurtenant to the meeting ends of the shoes, and means for operating the connecting threaded parts.

6. A driving member and a driven member, one of said parts including a shaft with a drum secured thereto and the other of said parts including a pulley with separated arms, shoes located between said arms, a threaded member borne by each shoe and a coöperating threaded member carried by the pulley, a connecting threaded member to cause the shoes to grip the drum, and means for simultaneously operating said connecting threaded members.

7. A driving member and a driven member, one of said parts including a drum secured thereto and the other of said parts carrying shoes linked together end to end and encircling said drum, and means operating upon the shoes at their points of connection for crowding them against the drum.

8. A driving member and a driven member, one of said parts including a drum secured thereto and the other of said parts including shoes having a slotted pivotal connection each with another, and means operating upon the shoes at their points of pivotal connection for crowding them against said drum.

9. A driving member and a driven member, one of said parts including a drum secured thereto and the other part carrying shoes each having a slotted pivotal connection with another shoe, and means connected at each pivot for crowding the shoes against the drum.

10. A driving member and a driven member, one of said parts including a drum secured thereto and the other of said parts having shoes each pivotally connected to another, and means located back of the points of connection of the shoes for crowding them against the drum.

11. A driving member and a driven member, one of said parts including a drum secured thereto and the other including a pulley having separated arms, shoes located between said arms and linked together to grip said drum, and means located back of the shoes and having an abutment against the pulley for crowding the shoes against the drum.

12. A driving member and a driven member, one of said parts including a drum secured thereto and the other including a pulley with separated arms, shoes located between said arms and each pivotally connected to another, means located back of the shoes for crowding them against the drum, and means for simultaneously operating said actuating means.

13. A driving member and a driven member, one of said parts including a drum secured thereto and the other including a pulley with separated arms, said arms having guide slots, shoes located and with their ends pivotally connected to each other between said arms, a guide extending from the shoes into the slots in said arms, and means located between the arms and back of the shoes for forcing the latter against the drum.

14. A driving member and a driven member, one of said parts having a cam connected therewith, clutch parts located between said members, a member for causing engagement of said clutch parts, and a member to hold said clutch parts in engagement and connected with said cam to control the gripping action of the clutch.

15. A driving member and a driven member, one of said parts having a cam connected therewith, clutch parts between said members, a member for causing initial engagement of the clutch parts, a holding member movable to position to retain the clutch parts in engagement, said movement also operating a connection with said cam to control the degree of gripping action of the clutch, and connection between said holding means and cam.

16. A driving member and a driven member, one of said parts being connected with a cam, clutch parts located between said members, a clutch operating member and a clutch holding member, the former separately movable to cause engagement of the clutch parts and the latter adapted to connect with said cam and separately movable to co-act with the clutch operating member, said clutch operating member and clutch holding member having connecting means to cause simultaneous operation of said parts to prevent operation of the clutch holding member.

17. A driving member and a driven member, one of said parts connected with a cam, clutch parts located between said members, a clutch engaging member and a clutch holding member, connections between the latter and said cam to vary the gripping action of the clutch, said clutch engaging member and clutch holding member being simultaneously movable to cause operation of the clutch and the clutch holding member being separately operable to operate the connection with said cam.

18. A driving member and a driven member, clutch parts located between said members, a slidable member to cause initial engagement of the clutch parts, a slidable member to retain said parts in engagement, and a device operatively connected with both of said members and arranged to operate upon the clutch upon relative rotation between said parts.

19. A driving member and a driven member, a clutch located between said members, a system of levers for operating the clutch, a member initially movable to operate said levers, and a second member operatively connected with the first and arranged to retain said clutch parts in engagement.

20. A driving member and a driven member, a clutch for connecting said parts, a member to initially engage the clutch parts, a second member to hold said clutch parts in engagement, means for operating said members, and connections between said operating means to secure said parts against relative movement.

21. A driving member and a driven member, one of said parts including a drum secured thereto and the other a pulley with two part arms, quills projecting from opposite sides of the pulley, bearings to support said quills and pulley independently of the shaft, a clutch member borne by the pulley, and means for operating the clutch to bind said drum.

22. A driving and a driven member, one of said parts including a pulley with a quill projecting therefrom and the other of said parts having a drum secured thereto, a clutch borne by the pulley to grip said drum, means for operating the clutch, said means including a collar slidable upon said quill to initially operate the clutch, and a second collar slidable upon said sleeve to hold the parts in operative engagement.

23. A driving and a driven member, one of said parts bearing a drum secured thereto and a cam, a clutch carried by the opposite part for gripping said drum, and clutch operating means including a sliding collar with a lever secured thereto to engage said cam, and a second collar pivotally connected with said lever.

24. A driving member and a driven member, one of said parts having a drum secured thereto and the other including a pulley having two part arms, shoes located between said arms, a pin located in slots in the arms and pivotally uniting said shoes, and means connected with said pin for crowding the shoes against said drum.

25. A driving member and a driven member, one of said parts having a screw thread connected therewith, a clutch between said members, a clutch operating member having pawls to engage said screw thread, a clutch holding member also connected with said pawls, and means for holding the pawls in engagement with said threads.

26. A driving member and a driven member, one of said parts having a thread connected therewith, a clutch between said parts, a clutch operating member having a pawl connected therewith, a clutch holding member, a link connecting said holding member with said pawl and arranged to retain the holding member against the clutch engaging member with the pawl in engagement with said thread.

27. A driving member and a driven member, one of said parts being connected with a screw thread and the other part bearing a quill, a clutch located between said members, a clutch operating part slidably mounted upon said quill and operatively connected with the clutch, a clutch holding part also slidably mounted upon the quill, a pawl connected with the clutch operating part and adapted to engage said screw thread, and a link connection between the clutch holding part and said pawl.

28. A driving member and a driven member, one of said parts having a thread connected therewith, a clutch between said parts, a clutch operating member having a pawl connected therewith, a clutch holding member, a link connecting said holding member with said pawl and with its pivotal point of attachment to the holding member arranged to pass to opposite sides of the line of greatest applied force between the holding member and pawl, whereby force applied to the pawl opposes movement of said holding member.

Signed at Johannesburg this 22d day of April 1907.

WALTER COMMON.

Witnesses:
Wm. D. Gordon,
C. J. Parham.